Patented Feb. 11, 1930

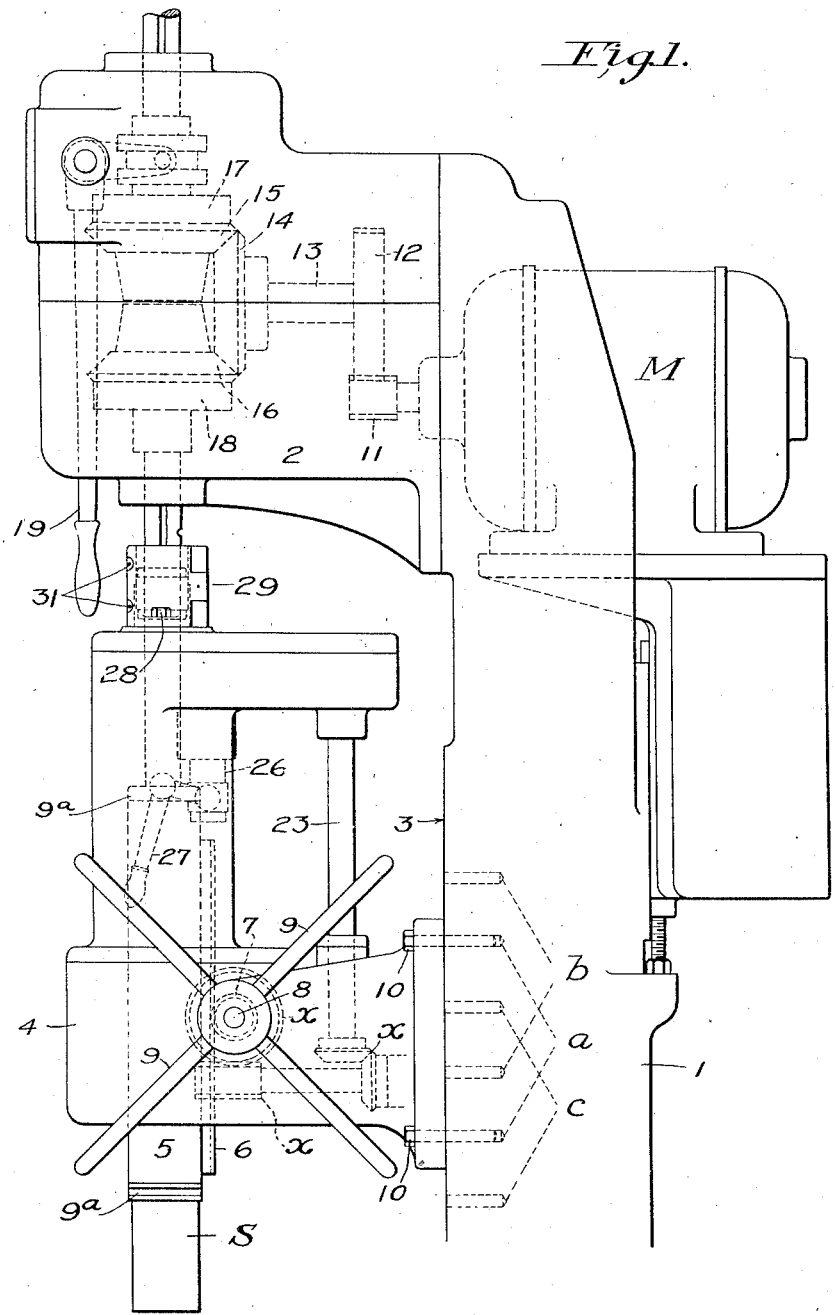

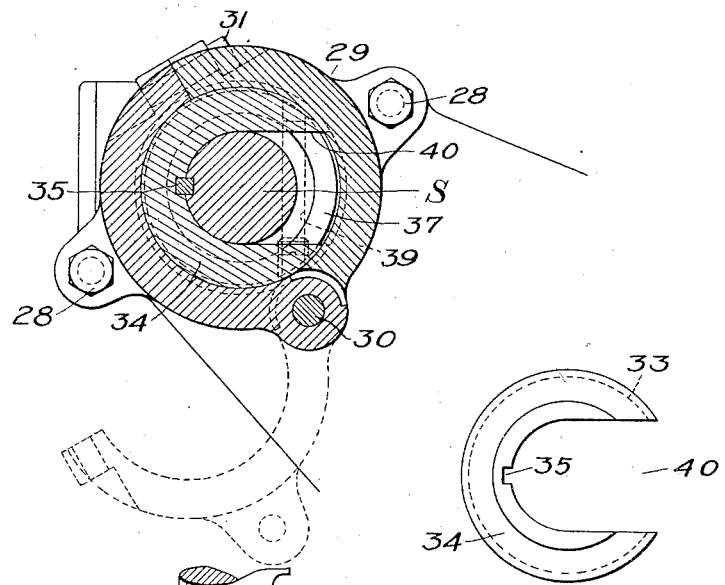
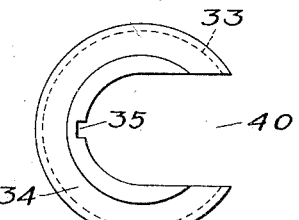
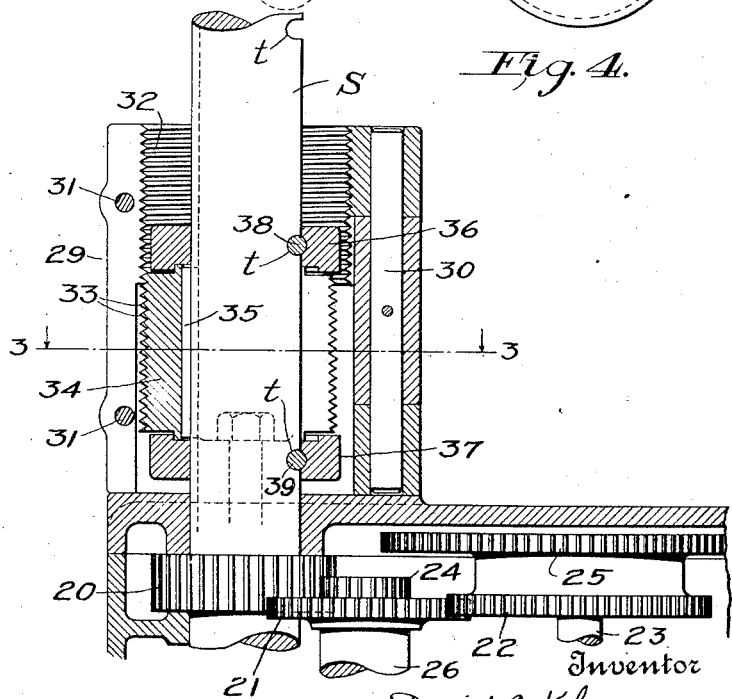

1,746,266

UNITED STATES PATENT OFFICE

DAVID C. KLAUSMEYER, OF CINCINNATI, OHIO, ASSIGNOR TO THE CINCINNATI BICKFORD TOOL COMPANY, OF CINCINNATI, OHIO, A CORPORATION OF OHIO

SPINDLE-FEEDING MEANS

Original application filed March 31, 1925, Serial No. 19,665. Divided and this application filed May 1, 1928. Serial No. 274,257.

This invention relates to that type of machine tool which is used to perform drilling and tapping operations in metal. A machine tool of this type is disclosed in my pending application Serial No. 19,665 filed March 31, 1925, of which this application is a division.

Due to the nature of the two above mentioned tooling operations the machine necessarily must be equipped and operated differently for each operation. For example, when drilling a hole of a given diameter the feed of the drill, per rotation, is necessarily relatively small and the exact amount of the feed, for most efficient operation, is determined by the nature of the metal being drilled and upon other factors. When tapping the same hole, the feed per rotation is necessarily substantially greater and must correspond exactly with the lead of a standard thread for that size hole regardless of the nature of the work. Obviously both feeds may not be effective simultaneously.

Inasmuch as machines of this type are used selectively for both drilling and tapping operations for holes of various diameters, and as the various size holes require different spindle feeds for both operations, it will readily be perceived that any improvement which facilitates interchange from one operation to the other, or which provides a more efficient tap feeding means, or which permits more ready change in the tap feeding means to give any predetermined feed as may be required by the size of the tap being operated, becomes of great importance.

One of the preferred means heretofore used for giving to tap spindles predetermined feeds, per rotation, is a lead screw fixed to and rotating with the tap spindle, and a co-operating stationary lead nut, the two being provided with intermeshing threads, the pitch of which corresponds to the pitch of the tap being used. Thus upon each rotation of the spindle the spindle and the tap carried thereby are given the proper axial feed.

To enable the lead screw and lead nut to be removed from the machine and replaced by others having threads of a different pitch, these elements heretofore have been located adjacent either the remote end of the spindle as disclosed in United States patent to Pletz No. 1,307,831 or at the tap receiving end thereof. When located at the remote end the resistance offered by the work causes the entire spindle to operate under a high compressive force which tends to buckle the spindle, thereby causing the spindle to bind, more or less, in its bearings. When located at the tap receiving end of the spindle the feeding device, in many instances, interferes with the work and is in the operator's way.

This invention has for an object to provide an improved spindle feeding device adapted to act upon the tap spindle substantially midway between its ends whereby the objectionable buckling tendency of the spindle is obviated and the device is maintained in a non-interfering position.

Another object of the invention is to provide an improved spindle feeding device which readily may be applied to and removed from the spindle at a point between spaced bearings without the necessity of withdrawing the spindle from its bearings.

A further object is to combine, in a drilling and tapping machine of that type in which a spindle supporting and feeding head is adjustably mounted on a main frame, a power actuated spindle feed mechanism adapted particularly to feed the spindle during drilling operations, and an independent spindle feeding mechanism, of the lead screw type, for feeding the spindle in accordance with the lead of a standard tap during a tapping operation; to so construct and arrange the two feeds that they are both adjustable bodily with the spindle supporting head; and to provide improved means for readily rendering inoperative either of said feeding means.

Still another object is to provide an improved lead screw and lead nut feeding mechanism and to embody therein means permitting ready attachment of the lead nut to the feed head; ready insertion of the lead screw into the lead nut, and ready attachment of the lead nut to the tool spindle in various axial positions.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1 is a side elevation of the upper portion of a drilling and tapping machine embodying the present invention. Fig. 2 is a vertical sectional view of my improved tap spindle feeding device and showing in elevation a portion of the drill spindle feeding device hereinafter to be described. Fig. 3 is a horizontal section substantially on the line 3—3 of Fig. 2. Fig. 4 is a detail end view of my improved lead screw.

Referring more specifically to the drawings my invention is disclosed as embodied in a combined upright drilling and tapping machine comprising a main frame or column 1, to which is secured, at its upper end, a bracket 2. This bracket is in the form of a casing and supports certain spindle rotating mechanism later to be described.

Intermediate its ends the column 1 is formed with a finished face 3 to which is adapted to be bolted, in any one of a plurality of predetermined positions, a member 4 commonly known as a spindle feed head because of the fact that it carries means for effecting feeding movements of the tool spindle. As shown in Fig. 1 the feed head may be secured to the column in any desired vertical position by means of bolts 10 adapted selectively to be threaded into any one of a plurality of sets of tapped holes $a, b$ or $c$. In machines adapted to perform drilling operations this head has translatably but non-rotatably journaled in it a spindle sleeve 5 provided with a rack 6 which is engaged by a pinion 7. This pinion is carried by a shaft 8 journaled in the feed head. Manual means, in the nature of a hand wheel 9, is provided for rotating the shaft 8 and the pinion carried thereby, to shift the sleeve 5 axially. Power means designated generally as $x$ also is provided for feeding the sleeve, and the spindle carried thereby, axially during a drilling operation. Rotatably journaled in the sleeve 5, and held against relative axial movement thereto by thrust bearings $9^a$, is a tool spindle S adapted to receive within its lower end either a drill or a tap. The other end of the spindle extends upwardly through suitable bearings in the bracket 2 and between said bearings it is engaged by the rotating mechanism above referred to.

A motor M, secured upon the upper end of the main frame 1 serves as a prime mover to effect rotation of the spindle. Inasmuch as the specific means for connecting the motor with the spindle is conventional and forms no part of this invention it will be described very briefly. Suffice it to say that the motor is connected with the spindle by means of a pinion 11, gear 12, shaft 13, bevel gear 14, and right and left turning gears 15 and 16, rotated by the gear 14, and adapted selectively to be secured to the spindle S through the action of clutches 17 and 18, controlled by a manually actuable lever 19. Thus either forward or reverse rotation may be transmitted to the tool spindle.

When the machine is used for drilling, a suitable drill point is secured to the lower end of the spindle and the forward rotation only need be utilized, withdrawal of the drill from the work usually being effected by the hand wheel 9 during forward rotation of the spindle. During this operation the spindle is given its feeding movement by the power feed shown and described in the parent application above referred to and including the mechanism carried by the feed head and designated as $x$. Power to actuate this feeding mechanism is taken from the rotary spindle S. To that end there is splined to the spindle a wide face gear 20 permanently in mesh with a shiftable gear 21 adapted, in one position, to mesh with a gear 22 fixed upon a shaft 23 which extends downwardly into the feed head and actuates the feed mechanism carried thereby. To permit a change in the rate of feed a smaller gear 24 is secured to the gear 21 and this smaller gear is adapted to be shifted into mesh with a gear 25 also secured to the shaft 23. It is to be understood that when the gears 24 and 25 are in mesh the gears 21 and 22 are out of mesh and vice versa. The gears 21 and 24 are secured upon an axially movable shaft 26 journaled in the feed hand and this shaft may be shifted, selectively to mesh the gears, by means of a bell crank lever 27 fulcrumed upon feed head.

When the machine is to be used for tapping the above described spindle feed is rendered ineffective by shifting the gears 21 and 24 to a position intermediate the gears 22 and 25 in which position of the gears no motion is transmitted to the shaft 23.

As will be perceived from the foregoing description the spindle S has bearings in the bracket 2 and in the feed head 4 located below and in spaced relation to said bracket. This invention provides an improved feeding means for the spindle, when the machine is used for tapping, consisting of a lead screw and lead nut both of which are carried by the feed head and act upon the spindle intermediate the head 4 and the bracket 2, which, as hereinbefore explained, is the most desirable location for a device of this nature.

Inasmuch as both the lead nut and lead screw must be removed and replaced by others each time a tap having a different pitch is used, and also as the tap feeding means must be rendered ineffective whenever the machine is used for drilling operations, means permitting ready removal of the tap feed is of great importance. To provide a suitable lead screw and nut between spaced bearings and so to construct the parts that they readily may be removed from the machine and replaced by others without removing the spindle, heretofore has been a problem. This problem has been solved by the provision of the improved device now to be described.

Removably secured to the upper end of the feed head 4, by screws 28, is a two-part lead nut 29. The sections of the lead nut are preferably semi-cylindrical and are hinged together along one edge by a pin 30. The opposite edges of the sections are adapted to be secured together by screws 31. The lead nut is formed with internal threads 32 which co-operate with external threads 33 formed on a lead screw 34 adapted to be inserted within the lead nut to a position co-axial with the spindle S to which it is held non-rotatably by a spline connection 35. Collars 36 and 37, secured to the spindle by means of pins 38 and 39, engage the ends of the lead nut and hold it against axial movement on the spindle.

It will readily be perceived that because of the fact that the lead nut is formed of relatively movable sections the nut may be opened and placed upon or removed from the spindle between spaced bearings, by a lateral movement. To enable the feed screw likewise to be placed within the lead nut and to be secured to the spindle, or removed therefrom, the lead nut is preferably formed with an open side 40 which gives the nut the general shape of the letter C as shown more particularly in Figs. 3 and 4.

As hereinbefore stated, the feed head is adapted to be secured in various vertical positions on the main frame. For certain purposes, however, it may be desirable to adjust the tool spindle vertically without varying the position of the feed head on the main frame. Therefore to enable the lead nut to be secured to the spindle in various positions the spindle is provided with a plurality of notches $t$ adapted to receive the pins 38 and 39.

When the initial position of the spindle is to be changed relative to the feed head, one section of the lead nut is unbolted and swung to the position shown in dotted lines in Fig. 3. The spindle is rotated until the lead screw is in position to give access to the pins 38 and 39 which are then removed. The lead screw is then withdrawn from the lead nut and spindle by moving it laterally. The spindle is then shifted axially relative to the feed head to the desired position, the lead screw is reinserted into the lead nut and the pins 38 and 39 inserted into two of the notches $t$ in the spindle, and the lead nut closed and fastened about the lead screw.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, I claim as new and desire to secure the following combinations and elements, or equivalents thereof, by Letters Patent of United States:—

1. A convertible drilling and tapping machine combining a main frame; spindle-rotating gearing mounted thereon; a feed head adjustably mounted on the main frame; a tool spindle mounted in said head and having a splined connection with said gearing; a sectional lead nut secured to the adjustable feed head; an open-sided lead screw removably secured to the spindle intermediate said feed head and said spindle rotating gearing, said lead screw having a threaded connection with said lead nut for feeding the spindle during a tapping operation; means to separate the sections of said lead-nut to permit lateral removal of said screw from said spindle thereby to render the tap feeding means ineffective, and spindle feeding mechanism, wholly independent of the lead screw and nut, mounted on the head and connected with the spindle for effecting translatory movement of the spindle during a drilling operation.

2. A convertible drilling and tapping machine combining a main frame; spindle rotating gearing mounted thereon; a feed head adjustably mounted on the main frame; a tool spindle mounted in said head and having a splined connection with said gearing; a sectional lead nut secured to the adjustable feed head; an open-sided lead screw removably secured to the spindle intermediate said feed head and said spindle rotating gearing, said lead screw having a threaded connection with said lead nut for feeding the spindle during a tapping operation; means to separate the sections of said lead nut to permit lateral withdrawal of said lead screw from said spindle thereby to render said tap feeding means ineffective; spindle feeding mechanism, wholly independent of the lead screw and nut, mounted on the head and connected with the spindle for effecting translatory movement of the spindle during a drilling operation; and means to render the last named feeding mechanism inoperative during the tapping operation.

3. A convertible upright drilling and tapping machine combining a main frame; spindle rotating gearing mounted on said frame and connected with a suitable source of power; a feed head mounted on said frame beneath said gearing and adjustable along the frame in a vertical direction; a sleeve translatably but non-rotatably mounted in said head; a tool spindle rotatably and non-translatably journaled in said sleeve and having a splined connection with said gearing; a rack on said sleeve; means carried wholly by said feed head and actuated by the rotation of said spindle and co-operating with said rack to feed said sleeve and spindle axially when the machine is used for drilling; means to render said spindle feed means ineffective; a lead nut fixedly secured upon said feed head; and a lead screw adapted to be removably secured upon said spindle in any one of a plurality of predetermined positions, and there to co-operate with said lead nut for giving to said spindle, a predetermined feed when the machine is used for tapping.

4. In a tapping machine, a tap feeding means combining a rotatable tap spindle; a normally stationary lead nut surrounding said spindle and comprising a plurality of relatively movable sections; a lead screw of substantially C-shape in cross section adapted to be inserted laterally into said nut to a position co-axial with said spindle; means to secure said lead screw to said spindle and to prevent relative rotary and axial movements therebetween; and means to lock the sections of the lead-nut against relative movement, with the internal threads thereof in mesh with the external threads of the lead screw.

5. A tapping machine combining a frame; a bracket secured to the upper end thereof; a feed head secured to the frame in spaced relation with respect to said bracket; a spindle rotatably and translatably journaled in said feed head; means carried by said bracket for rotating said spindle; means carried wholly by said feed head for feeding said spindle axially, said feeding means comprising an interiorly threaded lead nut consisting of two substantially semi-cylindrical sections hinged together on an axis extending in the direction of the axis of the spindle, said hinge affording means permitting one of said sections to be swung relative to the other; means to secure said sections to said feed head co-axial with said spindle; an exteriorly threaded open-sided lead screw adapted to be inserted laterally into said lead nut to mesh together the threads of the two and to position the lead screw coaxial with the spindle; and means to secure said lead screw upon said spindle.

6. In a tapping machine, a tap feeding means combining a rotatable tap spindle; a normally stationary feed head; an internally threaded lead nut removably secured to said head co-axial with said spindle and comprising a plurality of sections hinged together on an axis arranged lengthwise of said spindle, said hinge affording means permitting one of said sections to be swung relative to the other to permit the nut to be moved laterally to free it from the spindle to permit its replacement by another nut; an interiorly threaded lead screw adapted to co-operate with said nut, said screw being split in the direction of its length to permit it to be placed upon said spindle by a lateral movement; and means to hold said lead screw and said spindle against relative movement.

7. A tapping machine combining an upright frame; a feed head adjustably secured thereto; a bracket secured to the upper portion of the frame; a tap spindle rotatably journaled in said feed head and extending upwardly into said bracket; means supported by said bracket for rotating said spindle; an internally threaded lead nut removably secured to the top of said feed head and normally surrounding said spindle, said nut comprising a plurality of relatively movable sections adapted for separation to permit the nut to be placed about and removed from said spindle; an exteriorly threaded lead screw, of substantial C-shape in cross section, adapted by lateral movements to be placed upon and removed from said spindle; means to prevent relative rotation between said lead screw and said spindle; a collar fixed to said spindle at each end of said lead screw to prevent relative axial movement of the screw and spindle; and means for locating said collars and said lead screw in predetermined positions axially of said spindle.

8. A tap spindle feeding means comprising a normally stationary internally threaded lead nut formed of a plurality of sections one of which is movable to permit the nut to be placed about a spindle by a lateral movement; a substantially C-shaped lead screw provided with external threads and formed with an open side to permit it to be moved laterally into engagement with the threads of the lead nut; means to secure the lead screw against rotary and axial movement relative to the spindle; and means to hold the sections of the lead nut in operative position relative to the lead screw.

In witness whereof, I hereunto subscribe my name.

DAVID C. KLAUSMEYER.